United States Patent [19]
Hoffarth et al.

[11] Patent Number: 5,810,375
[45] Date of Patent: Sep. 22, 1998

[54] WHEELBARROW HANDLES

[75] Inventors: Richard L. Hoffarth, 9430 Lakeside Trail, Champlin, Minn. 55316; Mark J. Hoffarth, Clearwater, Minn.

[73] Assignee: Richard L. Hoffarth, Champlin, Minn.

[21] Appl. No.: 882,799

[22] Filed: Jun. 26, 1997

Related U.S. Application Data

[63] Continuation of Ser. No. 652,169, May 23, 1996, abandoned, which is a continuation of Ser. No. 340,646, Nov. 16, 1994, abandoned.

[51] Int. Cl.⁶ .................................................. B62B 1/20
[52] U.S. Cl. ........................ 280/47.31; 298/3; 16/111 R
[58] Field of Search ........................... 280/47.31, 304.5, 280/288.4, 769; 298/2, 3; 16/111 R, 110.5, 126, 125, DIG. 12; 172/13, 15, 17; 56/DIG. 18

[56] References Cited

U.S. PATENT DOCUMENTS

| | | | |
|---|---|---|---|
| 1,392,114 | 9/1921 | Caswell | 280/47.31 |
| 2,901,263 | 8/1959 | Van Loop, Jr. | 280/47.31 |
| 3,173,705 | 3/1965 | De Graff | 280/47.31 |
| 3,199,891 | 8/1965 | Grable et al. | 280/47.31 |
| 3,200,973 | 8/1965 | Galbraith | 214/140 |
| 3,235,281 | 2/1966 | Faucette | 280/47.31 |
| 3,282,600 | 11/1966 | Tonelli | 280/47.31 |
| 3,295,861 | 1/1967 | Lull | 280/47.16 |
| 3,404,427 | 10/1968 | Mack | 16/114 |
| 3,580,309 | 5/1971 | Hochstetler | 144/11 |
| 3,690,692 | 9/1972 | Florian et al. | 280/36 C |
| 3,706,461 | 12/1972 | Devol | 280/47.26 |
| 3,722,904 | 3/1973 | Puckett | 280/36 R |
| 3,827,369 | 8/1974 | Mueller | 104/118 |
| 4,109,933 | 8/1978 | O'Brian et al. | 280/653 |
| 4,174,849 | 11/1979 | Wetzel | 280/47.3 |
| 4,190,260 | 2/1980 | Pearce | 280/47.31 |
| 4,261,590 | 4/1981 | Schupbach | 280/47.31 |
| 4,270,786 | 6/1981 | Mattox | 298/3 |
| 4,281,950 | 8/1981 | Lehman et al. | 410/3 |
| 4,341,393 | 7/1982 | Gordon et al. | 280/47.26 |
| 4,471,996 | 9/1984 | Primeau | 298/3 |
| 4,589,508 | 5/1986 | Hoover et al. | 180/19.1 |
| 4,640,520 | 2/1987 | Wing et al. | 280/47.31 |
| 4,740,008 | 4/1988 | Johnson | 280/475 |
| 4,767,128 | 8/1988 | Terhune | 280/47.2 |
| 4,781,396 | 11/1988 | King | 280/653 |
| 4,789,171 | 12/1988 | Porter | 280/47.18 |
| 4,802,681 | 2/1989 | Hung | 280/47.18 |
| 4,865,372 | 9/1989 | Gabriel | 294/49 |
| 4,921,305 | 5/1990 | Steer | 298/3 |
| 4,951,956 | 8/1990 | Vittone | 280/47.31 |
| 4,958,407 | 9/1990 | Johnson | 16/125 X |
| 4,962,833 | 10/1990 | McCurdy | 188/2 R |
| 5,153,966 | 10/1992 | Godwin | 16/111 |
| 5,190,351 | 3/1993 | Klumpjan | 298/3 |
| 5,256,025 | 10/1993 | Williamson | 298/3 X |

FOREIGN PATENT DOCUMENTS

| | | | |
|---|---|---|---|
| 2148208 | 5/1985 | United Kingdom | 280/47.31 |
| 2246544 | 2/1992 | United Kingdom | 280/47.31 |

*Primary Examiner*—Christopher P. Ellis
*Attorney, Agent, or Firm*—Faegre & Benson LLP

[57] ABSTRACT

A wheelbarrow handle including a closed loop hand-grip. The hand-grip can be an integral portion of the handle, or retrofit to existing wheelbarrow handles by a mounting mechanism.

26 Claims, 4 Drawing Sheets

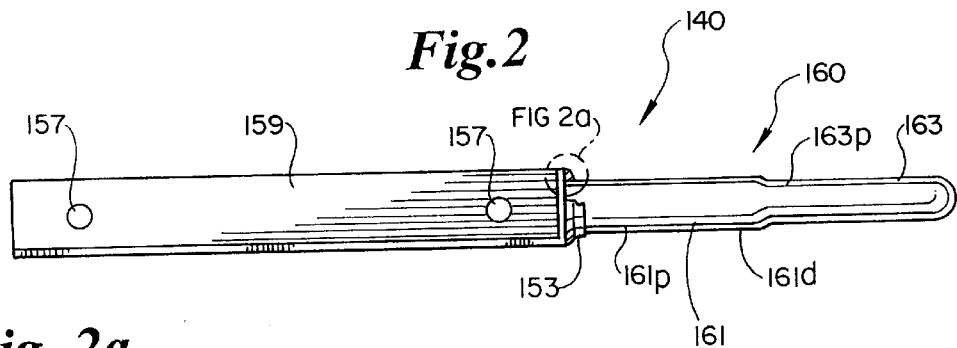
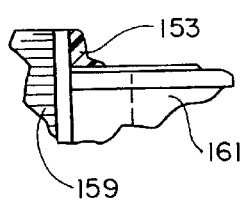
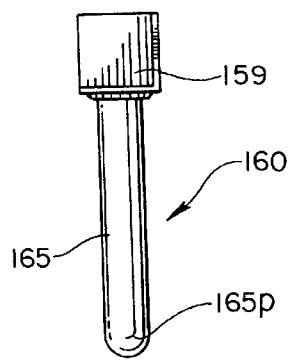
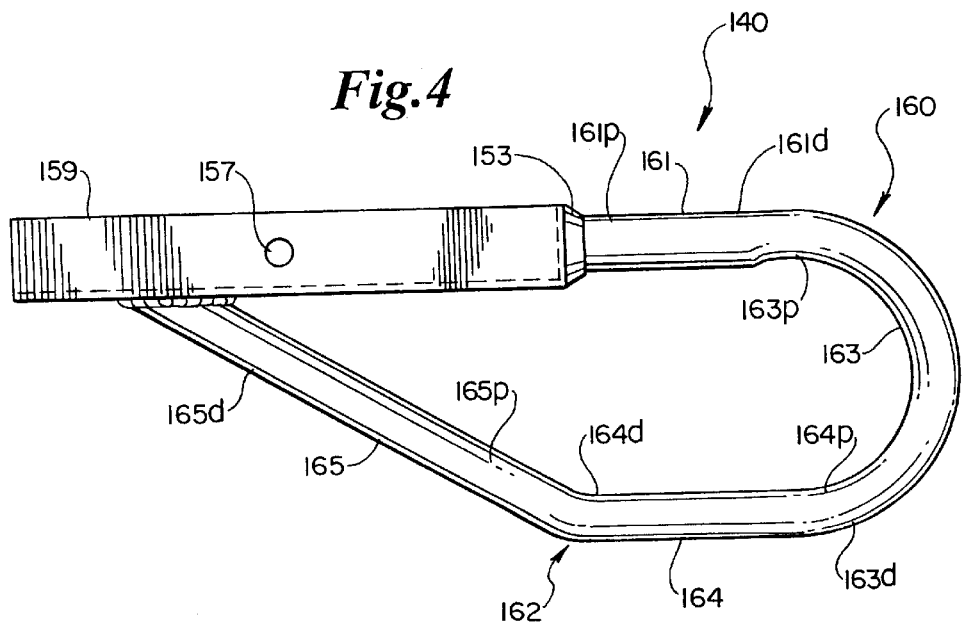

5,810,375

WHEELBARROW HANDLES

This is a file wrapper continuing application of U.S. Pat. application Ser. No. 08/652,169, filed May 23, 1996, now abandoned, which is a file wrapper continuing application of U.S. patent application Ser. No. 08/340,646, filed Nov. 16, 1994, now abandoned.

BACKGROUND OF THE INVENTION

1. Field of the Invention

The present invention relates generally to wheelbarrows and handles therefore. In particular, the present invention is a hand-grip for wheelbarrow handles.

2. Description of the Related Art

Typical wheelbarrow handles are simply long wooden shafts connected to a single wheel at a proximal end, and extending from underneath a bucket at a distal end so as to create linear hand-grips. The diameter of the shaft is frequently reduced at the distal end to increase gripability. While such handles are generally effective for permitting stable operation of a wheelbarrow during loading and transport, they are not well designed for use while unloading a wheelbarrow. In order to unload material from the front of a wheelbarrow—typically the desired unloading procedure—it is usually necessary to reposition the hands from above the handle to below the handle. Such repositioning of the hands requires significant strength and dexterity.

One hand-grip for a wheelbarrow handle is disclosed in the Godwin U.S. Pat. No. 5,153,966. The handles shown in the Godwin patent include hand-grips which extend upwardly from the distal end of the wheelbarrow handles to facilitate lifting of the wheelbarrow during transport.

The Vittone U.S. Pat. No. 4,951,956 discloses a fairly complex wheelbarrow handle which includes a pivotable grip. Use of this grip enables the hand to remain in continuous contact with the handle as the wheelbarrow is dumped.

It is evident that there is a continuing need for improved wheelbarrow handles. In particular, there is a need for a simple wheelbarrow handle equipped with a hand-grip which enables controlled front dumping. To be commercially viable, any such hand-grip must be efficient to manufacture.

SUMMARY OF THE INVENTION

The present invention is a hand-grip configured to extend from a wheelbarrow handle shaft. The wheelbarrow handle is convenient to use and enables controlled front dumping. The hand-grip can also be efficiently manufactured.

In one embodiment, the hand-grip includes a linear portion and a curved portion. The linear portion has a proximal end configured to extend from a distal end of the wheelbarrow handle shaft, and a distal end. The curved portion has a proximal end extending from the distal end of the linear portion, and a distal end. The curved portion extends downwardly from the linear portion.

Another embodiment of the wheelbarrow handle hand-grip includes a closed loop portion having proximal and distal ends. The proximal end extends from the distal end of the curved portion. The distal end is configured to extend from the wheelbarrow handle shaft.

The hand-grip can be formed as an integral member extending from the wheelbarrow handle shaft. Alternatively, a mounting mechanism can be used to mount the hand-grip to the shaft of a wheelbarrow handle.

BRIEF DESCRIPTION OF THE DRAWINGS

FIG. 2 is a top view of the wheelbarrow handle hand-grip illustrated in FIG. 1.

FIG. 2a is a detailed view of a portion of the hand-grip shown in FIG. 2, illustrating the flared transition area.

FIG. 3 is a view of the wheelbarrow handle hand-grip illustrated in FIG. 1, taken from the proximal end.

FIG. 4 is a side view of the wheelbarrow handle hand-grip illustrated in FIG. 1.

DETAILED DESCRIPTION OF THE PREFERRED EMBODIMENTS

Figure 1:
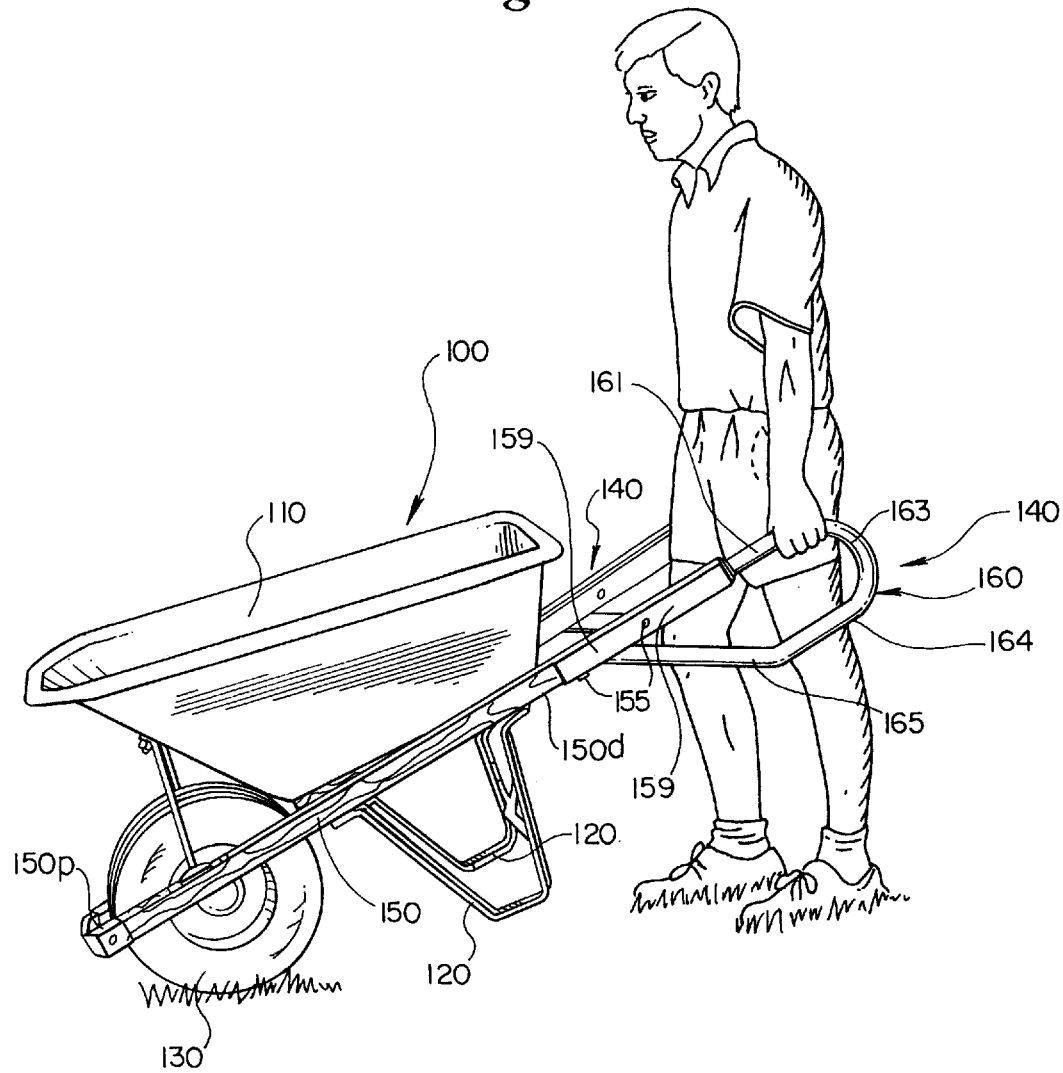
FIG. 1 is a side view of a wheelbarrow handle including a hand-grip in accordance with a first embodiment of the present invention.

FIG. 1 is an illustration of a wheelbarrow 100 which includes a handle 140 having a hand-grip 160 in accordance with a first embodiment of the present invention. As shown, wheelbarrow 100 includes container 110, a pair of support legs 120, single front wheel 130 and handles 140. A standard shaft 150 with a proximal end 150p is mounted adjacent to the wheel 130. Handle 140 is attached to the distal end 150d of the shaft 150. Handle 140 can be "retrofit" onto an existing wheelbarrow shaft 150 or provided as a "full replacement" handle. The "retrofit" version of hand-grip 160 includes means (e.g., bolts) for attaching the handles 140 and installation instructions for use by the purchaser.

Hand-grip 160 can be described in greater detail with reference to FIGS. 2–4. To facilitate the description of the hand-grip 160, the relative positions of the elements of the hand-grip are described with respect to the longitudinal axis of shafts 150 when handles 140 are mounted to wheelbarrow 100 oriented in an upright position (i.e., conventionally oriented) with respect to ground.

Hand-grip 160 is fastened to a mounting bracket 159 (e.g., by welds in the embodiment shown in FIGS. 1–4), and includes a linear portion 161 extending from the distal end of the bracket generally in line (i.e., coaxially) with the longitudinal axis of the shaft 150. A loop portion 162 extends downwardly from the longitudinal axis and returns (i.e., curves in the embodiment shown) towards the container 110 of the wheelbarrow 100. The loop portion 162 is characterized by: (i) a 180° curved section 163 extending at a proximal end 163p from the distal end 161d of the linear portion 161, (ii) a substantially straight section 164 extending at a proximal end 164p from the distal end 163d of the curved section 163 in substantially parallel relationship to the linear portion 161, and (iii) an upwardly angled section 165 extending at a proximal end 165p from the distal end 164d of the straight section 164 which returns towards the longitudinal axis of shaft 150. The distal end 165d of the angled section 165 is welded or otherwise mounted to bracket 159 in the embodiment shown in FIGS. 1 and 4 to form a closed loop.

The linear portion 161 of the hand-grip 160 forms an extension of the shaft 150 and extends along the longitudinal axis of the shaft. The linear portion 161 of the hand-grip 160 is typically gripped during normal transport of the wheelbarrow 100. The curved section 163 of the hand-grip 160 provides a smooth circular or elliptical contour over which a loosely gripped hand can easily glide as it travels from a top or "transport" position on the linear portion 161 to a bottom or "dumping" position on the straight section 164 of the loop portion 162. The angled section 165 may also be grasped when front dumping the wheelbarrow 100 as this section will be closest to the user when the wheelbarrow 100 approaches completion of its dumping motion and the longitudinal axis of shaft 150 begins to extend beyond vertical. The outside surface of the entire loop portion 162 is smooth so as to permit a hand supporting the wheelbarrow 100 in a transport position to easily slide from section to section without requiring complete detachment of the hand from the hand-grip 160. Such "full-contact" transition of the hands from section to section greatly facilitates front dumping of the wheelbarrow 100.

A variety of chemical and mechanical means for attaching the handle 140 to shaft 150 are well known to those skilled in the art. The primary requirement for the attaching means is simply that the means possess sufficient structural integrity to withstand the shear forces repeatedly exerted upon the attaching means during routine use of the wheelbarrow 100. The embodiment shown in FIGS. 1–4 includes a bracket 159 which is an elongated section of angle iron for retrofitting the handle 140 to the distal longitudinal end 150d of the shaft 150 of a wheelbarrow 100. A bracket 159 configured and arranged to receive about 8 to 20 inches of the distal longitudinal end 150d of the shaft 150 will generally be sufficient to ensure that the attachment possesses sufficient structural integrity to handle routine use and abuse. Bracket 159 includes a plurality of apertures 157. Apertures 157 are sized to receive bolts 155 for mounting the bracket 159, and therefore handle 140 and its hand-grip 160, to shafts 150. Although not shown, brackets of other constructions (e.g., "U"-shaped channel members, tubular sleeves and flat plates) can also be used.

As shown in FIGS. 1–4, a flared surface 153 can be beneficially incorporated at the point where the linear portion 161 of the hand-grip 160 is attached to bracket 159. Incorporation of a flared surface 153 avoids the discomfort experienced when the hand of a user is compressed against the end of the bracket 159 —such as would commonly occur when pushing the wheelbarrow 100 up an incline—by providing a smooth and comfortable transitional surface from the smaller rounded diameter of the linear portion 161 of the hand-grip 160 to the larger configuration of the bracket. Flared surface 153 also functions as a "stop" to help prevent the user's hands from sliding beyond linear portion 161 and onto bracket 159. In the embodiment shown in FIGS. 1–4, flared surface 153 is provided by a tapered ring (e.g., an O-ring), extending around linear portion 161 of hand-grip 160. In other embodiments (e.g., that described below with reference to FIGS. 5–6), the flared surface 153 can be provided by flaring the proximal end 161p of the linear portion 161 of the hand-grip 160.

In addition or as an alternative to bolts 155, suitable fastening means for attaching the bracket 159 to the shaft 150 include any of the well known means for attaching such structural components including mechanical means such as friction fittings, nails, staples, screws, rivets, welds, and clamps. Chemical means such as industrial adhesives can also be used.

The fastening mechanism selected for any particular application will depend upon the nature of the materials from which handle 140 and shaft 150 are fabricated.

The hand-grip 160 may be manufactured from any material capable of withstanding the stresses placed upon the hand-grip during normal use of the wheelbarrow 100. Suitable materials include solid, honeycomb and hollow lengths of steel, aluminum, plastic, fiberglass, wood, and the like. The fastening mechanism used to mount hand-grip 160 to bracket 159 will depend on the nature of the materials from which the hand-grip and bracket are fabricated.

The optimal size of the various portions and sections of the hand-grip 160 depend upon several factors including the capacity of the container 110, the length of the shaft 150, the height and hand size of the person using the wheelbarrow 100, and the like.

Generally, a hand-grip 160 possessing the dimensions set forth in Table One below will provide acceptable performance and comfort for most users.

TABLE ONE

|  | Length (in) | Periphery (in) | Radius of Curvature (in) | Angle (°) |
| --- | --- | --- | --- | --- |
| Linear Portion (161) | 3 to 10 | ¾ to 1½ |  |  |
| Curved Section (163) |  | ¾ to 1½ | 3 to 5 |  |
| Straight Section (164) | 3 to 10 | ¾ to 1½ |  |  |
| Angled Section (165) |  | ¾ to 1½ | 3 to 5 | 30 to 60 |

In the embodiment shown in FIGS. 1–4, angled section 165 of hand-grip 160 extends all the way and is mounted to bracket 159 to form a closed loop portion 162. Other embodiments of handle 140 (not shown) do not include angled section 165, and terminate at distal end 163d of curved section 163 or along the length of straight section 164 to form an open loop portion 162. In yet other embodiments, (also not shown), linear portion 161 of hand-grip 160 need not be coaxial with or parallel to shaft 150. For example, linear portion 161 can extend above or below the distal end 150d of shaft 150 to accommodate users of varying heights and shafts of varying lengths. Depending upon the orientation of the distal end 150d of shaft 150, linear portion 161 can extend at an angle with respect to the longitudinal axis of the shaft to facilitate user comfort.

Figure 5:
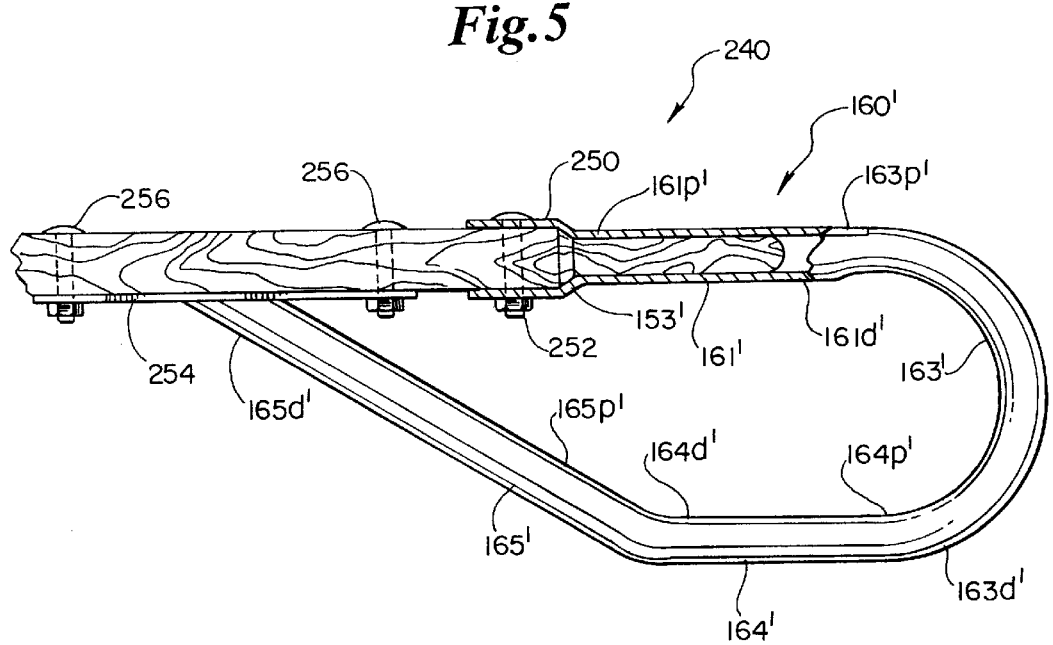
FIG. 5 is a side view, with portions thereof shown in section, of a wheelbarrow handle including a hand-grip in accordance with a second embodiment of the present invention.
Figure 6:
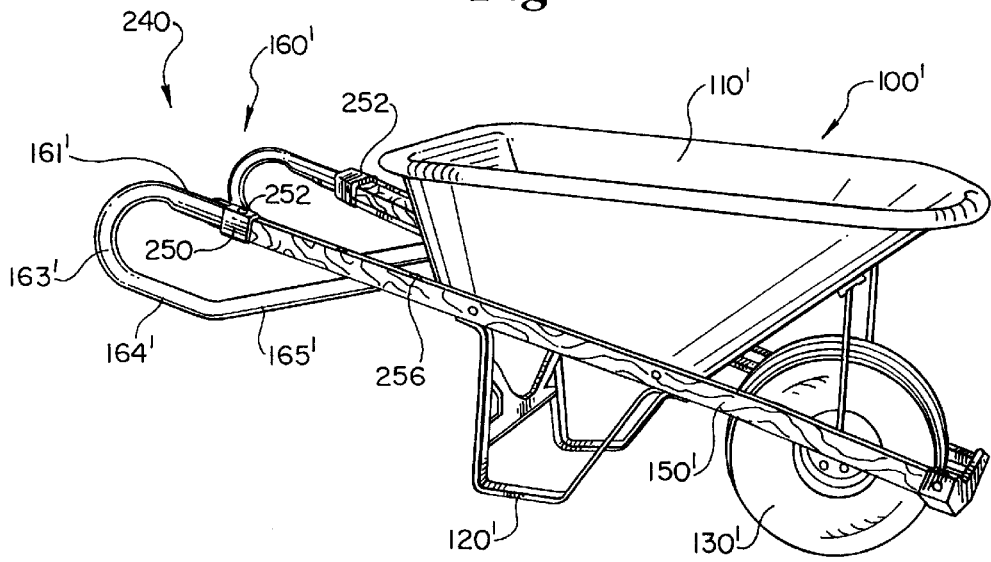
FIG. 6 is a side view of a wheelbarrow including the hand-grip shown in FIG. 5.

Wheelbarrow handle 240, a second embodiment of the present invention, is illustrated in FIGS. 5 and 6. Features and elements of handle 240 that can be identical to those of handle 140 described above are indicated by common but primed reference numbers (e.g., "x'") in FIGS. 5 and 6. As shown, the proximal end 161p' of linear portion 161' is flared at section 153' to form an enlarged cylindrical mount 250 having a cross-sectional dimension sized to engage the distal end 150d' of shaft 150'. Mount 250 is securely fastened to shaft 150' by bolt 252 which extends through the mount and shaft. A mounting plate 254 is attached (e.g., by welding) to distal end 165d' of angled section 165'. Mounting plate 254 is securely fastened to shaft 150' by bolts 256. Mount 250 and mounting plate 254 of handle 240 effectively perform the function of bracket 159 of handle 140.

Figure 7:
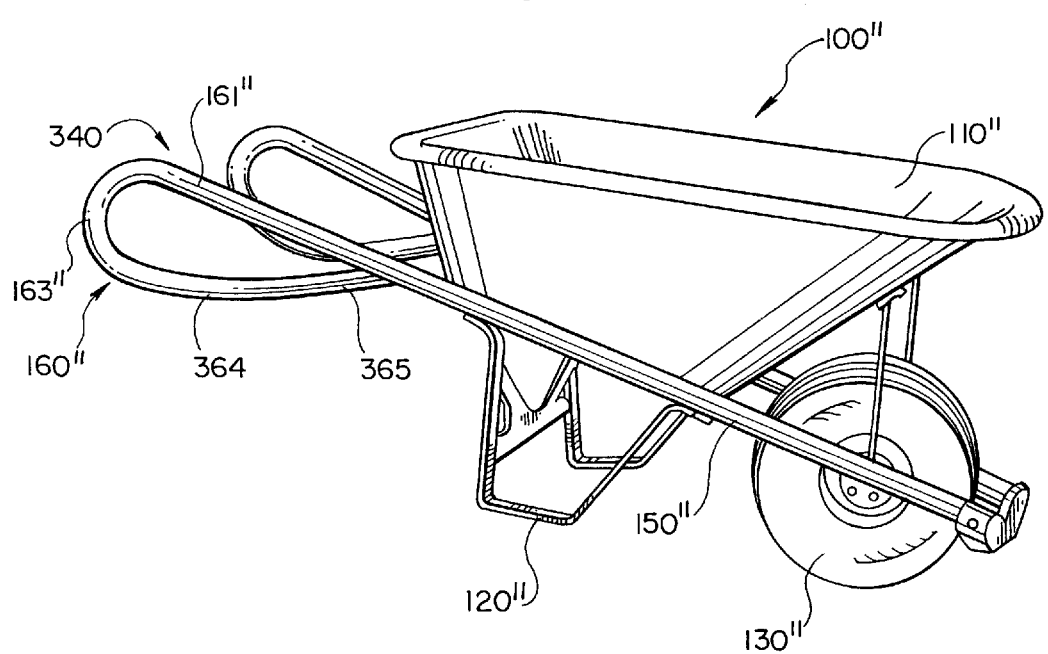
FIG. 7 is an illustration of a wheelbarrow including a handle with a hand-grip in accordance with a third embodiment of the present invention.

Wheelbarrow handle 340, a third embodiment of the present invention, is illustrated in FIG. 7. Features and elements of handle 340 that can be identical to those of handle 140 described above are indicated by common but twice primed (e.g. "x''') reference numbers in FIG. 7. Handle 340 is a one-piece member, fabricated integrally with (i.e., from the same stock material as) shaft 150'. By way of example, handle 340 and shaft 150" can be molded from polymer materials or fabricated from metal tubing. Loop portion 162" of handle 340 also includes sections 364 and 365 that are gently curved, unlike corresponding sections 164 and 165 of handle 140 that are straight. The relatively large radius of curvature of handle sections 364 and 365 result in a continuously curved handle 340.

Although the present invention has been described with reference to preferred embodiments, those skilled in the art will recognize that changes can be made in form and detail without departing from the spirit and scope of the invention.

What is claimed is:

1. A hand-grip for use in connection with a wheelbarrow handle shaft, including:
    a continuous linear portion having a proximal end and a distal end, wherein the linear portion is configured to extend generally parallel to and generally coaxial with a distal end of the wheelbarrow handle shaft;
    a continuous curved portion having a radius of curvature of at least three inches and a length of at least about four inches, a proximal end attached to and extending from the distal end of the linear portion, and a distal end, the curved portion extending downwardly from the linear portion in an arc opening toward the proximal end of the linear portion; and
    a smooth and continuous transition surface between the linear portion and the curved portion to enable a users hand to freely slide between the linear and curved portions without being removed from the hand-grip while the user slides their hand from the linear portion to the curved portion in the course of raising and dumping the wheelbarrow.

2. The hand-grip of claim 1 and further including a closed loop portion having a proximal end extending from the distal end of the curved portion, and a distal end configured to extend from the wheelbarrow handle shaft, wherein the closed loop portion is continuous to enable a user's hand to freely slide between the distal end of the curved portion and the distal end of the closed loop portion without being removed from the hand-grip.

3. The hand-grip of claim 2 and further including a mounting mechanism for mounting the hand-grip to the shaft of the wheelbarrow handle.

4. A wheelbarrow including the hand-grip of claim 3.

5. The hand-grip of claim 3 wherein the mounting mechanism includes:
    a first fastening device on the proximal end of the linear portion of the hand-grip, for mounting the linear portion of the hand-grip to the distal end of the wheelbarrow handle shaft; and
    a second fastening device on the distal end of the closed loop portion, for mounting the distal end of the closed loop portion to the wheelbarrow handle shaft.

6. A wheelbarrow including the hand-grip of claim 5.

7. The hand-grip of claim 5 wherein the first fastening device includes a wheelbarrow handle shaft-engaging cylinder on the proximal end of the linear portion of the hand-grip.

8. The hand-grip of claim 5 wherein the second fastening device includes:
    a wheelbarrow handle shaft-engaging plate on the distal end of the closed loop portion; and
    one or more fasteners for mounting the plate to the wheelbarrow handle shaft.

9. The hand-grip of claim 3 wherein the mounting mechanism includes:
    an elongated wheelbarrow handle shaft-engaging member having first and second opposite ends, wherein the proximal end of the linear portion of the hand-grip is fixedly mounted to the first end, and the distal end of the closed loop portion is fixedly mounted to the second end; and
    one of more fasteners for mounting the wheelbarrow handle shaft-engaging member to the shaft of the wheelbarrow handle.

10. A wheelbarrow including the hand-grip of claim 9.

11. The hand-grip of claim 2 wherein the closed loop portion includes:
    a linear section having a proximal end extending from the distal end of the curved portion, and a distal end, the linear section extending generally parallel to the linear portion; and
    an angled section having a proximal end extending from the distal end of the linear section, and a distal end configured to extend from the wheelbarrow handle shaft.

12. A wheelbarrow including the hand-grip of claim 11.

13. The hand-grip of claim 1 wherein the hand-grip is configured to be integral with the wheelbarrow handle.

14. A wheelbarrow including the hand-grip of claim 13.

15. The hand-grip of claim 1 and further including a mounting mechanism for mounting the hand-grip to the shaft of the wheelbarrow handle.

16. The hand-grip of claim 1 wherein the continuous curved position has a radius of curvature of at least three and one-half inches.

17. The hand-grip of claim 1 wherein the continuous curved position has a radius of curvature of at least four inches.

18. The hand-grip of claim 1 wherein the continuous curved position has a radius of curvature of at least four and one-half inches.

19. A wheelbarrow having handles with hand-grips, each handle attached to a wheelbarrow handle shaft, each hand-grip including:
    a continuous linear portion having a proximal end and a distal end, wherein the linear portion is configured to extend generally parallel to and generally coaxial with a distal end of the wheelbarrow handle shaft;
    a continuous curved portion having a radius of curvature of at least three inches and a length of at least about four inches, a proximal end attached to and extending from the distal end of the linear portion, and a distal end, the curved portion extending downwardly from the linear portion in an arc opening toward the proximal end of the linear portion; and
    a smooth and continuous transition surface between the linear portion and the curved portion to enable a users hand to freely slide between the linear and curved portions without being removed from the hand-grip while the user slides their hand from the linear portion to the curved portion in the course of raising and dumping the wheelbarrow.

20. The wheelbarrow of claim 19, wherein the hand-grip further includes a closed loop portion having a proximal end extending from the distal end of the curved portion, and a distal end configured to extend from the wheelbarrow handle shaft, wherein the closed loop portion is continuous to enable a user's hand to freely slide between the distal end of the curved portion and the distal end of the closed loop portion without being removed from the hand-grip.

21. The wheelbarrow of claim 20, wherein the hand-grip further includes a mounting mechanism for mounting the hand-grip to the wheelbarrow handle shaft, the mounting mechanism including:

a first fastening device including a wheelbarrow handle shaft-engaging cylinder on the proximal end of the linear portion of the hand-grip, for mounting the linear portion of the hand-grip to the distal end of the wheelbarrow handle shaft; and a second fastening device on the distal end of the closed loop portion, for mounting the distal end of the closed loop portion to the wheelbarrow handle shaft.

22. The wheelbarrow of claim 20, wherein the hand-grip further includes a mounting mechanism for mounting the hand-grip to the wheelbarrow handle shaft, the mounting mechanism including:

a first fastening device including a wheelbarrow handle shaft-engaging plate on the proximal end of the linear portion of the hand-grip, for mounting the linear portion of the hand-grip to the distal end of the wheelbarrow handle shaft;

a second fastening device on the distal end of the closed loop portion, for mounting the distal end of the closed loop portion to the wheelbarrow handle shaft; and one or more fasteners for mounting the plate to the wheelbarrow handle shaft.

23. The wheelbarrow of claim 19 including a mounting mechanism for mounting the hand-grip to the wheelbarrow handle shaft.

24. The wheelbarrow of claim 19 wherein the continuous curved position of the hand-grip has a radius of curvature of at least three and one-half inches.

25. The wheelbarrow of claim 19 wherein the continuous curved position of the hand-grip has a radius of curvature of at least four inches.

26. The wheelbarrow of claim 19 wherein the continuous curved position of the hand-grip has a radius of curvature of at least four and one-half inches.

* * * * *